(12) United States Patent
Albarran Moyo et al.

(10) Patent No.: US 9,671,989 B2
(45) Date of Patent: Jun. 6, 2017

(54) PRINT WORKFLOW MANAGEMENT

(75) Inventors: Manuel Angel Albarran Moyo, Barcelona (ES); Peter Morovic, Barcelona (ES); Jan Morovic, Colchester (GB)

(73) Assignee: HEWLETT-PACKARD DEVELOPMENT COMPANY, L.P., Houston, TX (US)

(*) Notice: Subject to any disclaimer, the term of this patent is extended or adjusted under 35 U.S.C. 154(b) by 1729 days.

(21) Appl. No.: 12/786,841

(22) Filed: May 25, 2010

(65) Prior Publication Data
US 2011/0292433 A1    Dec. 1, 2011

(51) Int. Cl.
G06F 3/12 (2006.01)

(52) U.S. Cl.
CPC .......... *G06F 3/1285* (2013.01); *G06F 3/1208* (2013.01); *G06F 3/1228* (2013.01); *G06F 3/1256* (2013.01)

(58) Field of Classification Search
None
See application file for complete search history.

(56) References Cited

U.S. PATENT DOCUMENTS 6,317,142 B1 * 11/2001 Decoste et al. ............... 715/762
7,318,086 B2 * 1/2008 Chang et al. ................. 709/217
2007/0252857 A1   11/2007 Watase
2008/0183754 A1   7/2008 Kitada
2008/0209311 A1 * 8/2008 Agronik et al. .............. 715/234
2009/0100445 A1   4/2009 Yong-In et al.
2009/0310183 A1 * 12/2009 Sone .................... G06F 9/45512
                                                    358/1.18

OTHER PUBLICATIONS

Bryan Yeager; "EFI Fiery VUE: Re-inventing the Print Driver?"; Jan. 28, 2010; http://blog.infotrends.com/wordpress/?p=1846.
"Integrated Workflow in the New Business of PrintingTM"; 2006; http://www.xerox.com/downloads/usa/en/s/solutions_digital_workflow_whitepaper_freeflow.pdf; Interquest, Ltd.
Adobe Photoshop® Plug-Ins*:Color Darkroom V1.0 ICC Color Profile Editor for RGB Printer Profiles; http://www.antelligent.com/pages/ps_plugins.html.

* cited by examiner

*Primary Examiner* — Marivelisse Santiago Cordero
*Assistant Examiner* — Neil R McLean
(74) *Attorney, Agent, or Firm* — HP Inc.—Patent Department

(57) ABSTRACT

A method for managing print workflow performed by a physical computing system includes, with an add-on application executed by the physical computing system, interfacing with a printing-capable application executed by the physical computing system; with the add-on application, interfacing with hardware components of a printing device; and with the add-on application, providing additional printing related functionality to the printing-capable application.

2 Claims, 6 Drawing Sheets

```
                                600

┌─────────────────────────────────────────────────────────────┐
│ With an add-on application executed by a physical computing │
│ system, interface with a printing-capable application       │
│ executed by the physical computing system                   │
│                        (step 602)                           │
└─────────────────────────────────────────────────────────────┘
                                │
                                ▼
┌─────────────────────────────────────────────────────────────┐
│  With the add-on application, interface with hardware       │
│            components of a printing device                  │
│                       (step 604)                            │
└─────────────────────────────────────────────────────────────┘
                                │
                                ▼
┌─────────────────────────────────────────────────────────────┐
│ With the add-on application, provide additional printing    │
│   related functionality to the printing-capable application │
│                       (step 606)                            │
└─────────────────────────────────────────────────────────────┘
                                │
                                ▼
┌─────────────────────────────────────────────────────────────┐
│   With the add-on application, receive data from the        │
│                    printing device                          │
│                       (step 608)                            │
└─────────────────────────────────────────────────────────────┘
```

*Fig. 6*

PRINT WORKFLOW MANAGEMENT

BACKGROUND

People often use computing systems to edit various types of electronic documents. These electronic documents are often sent to a printing device to be printed onto paper or another type of print medium. Electronic documents may represent text, photographs, and various graphic designs. People often use various computer applications to create, edit, and manage the various types of electronic documents. To print an electronic document, a user typically selects the print function from a toolbar menu within the computer application used to manage the electronic document. After the user selects the print function, the electronic document is processed by a printer driver. The printer driver provides the interface to the hardware of whatever printing device will print the electronic document.

A computer application managing an electronic document to be printed does not itself provide the user with a way of interacting closely with the printing device. Rather, the user simply selects the print function and the printer driver takes over the printing process. However, modern printing devices provide several features regarding the coloring and placement of images or text onto the print medium. These printing devices typically come with a separate printer utility application which will allow a user to fully utilize various features which may come with the printing device. However, these printer utility applications are separate from the computer applications used to manage and print various types of electronic documents. Thus, the user must open a new application to fully use the printing device features. Furthermore the printer utility application that comes with the printing device may not include editing tools which would be useful for editing a specific type of electronic document that is to be printed.

Using current printing processes, a user will first print an electronic document and then view the printout. If the coloring or placement is not satisfactory, then the user will make changes to the electronic document using the electronic document's associated computer application. The user will then reprint the electronic document and again view the printout. This process may often need to be repeated several times for each different electronic document that the user desires to print. Furthermore, the user may need to use a separate printer utility application, if available, to utilize the full features of the printing device performing the desired print job.

BRIEF DESCRIPTION OF THE DRAWINGS

The accompanying drawings illustrate various embodiments of the principles described herein and are a part of the specification. The illustrated embodiments are merely examples and do not limit the scope of the claims.

FIG. 6 is a flowchart showing an illustrative method for managing a print workflow, according to one example of principles described herein.

Throughout the drawings, identical reference numbers designate similar, but not necessarily identical, elements.

DETAILED DESCRIPTION

Figure 1:
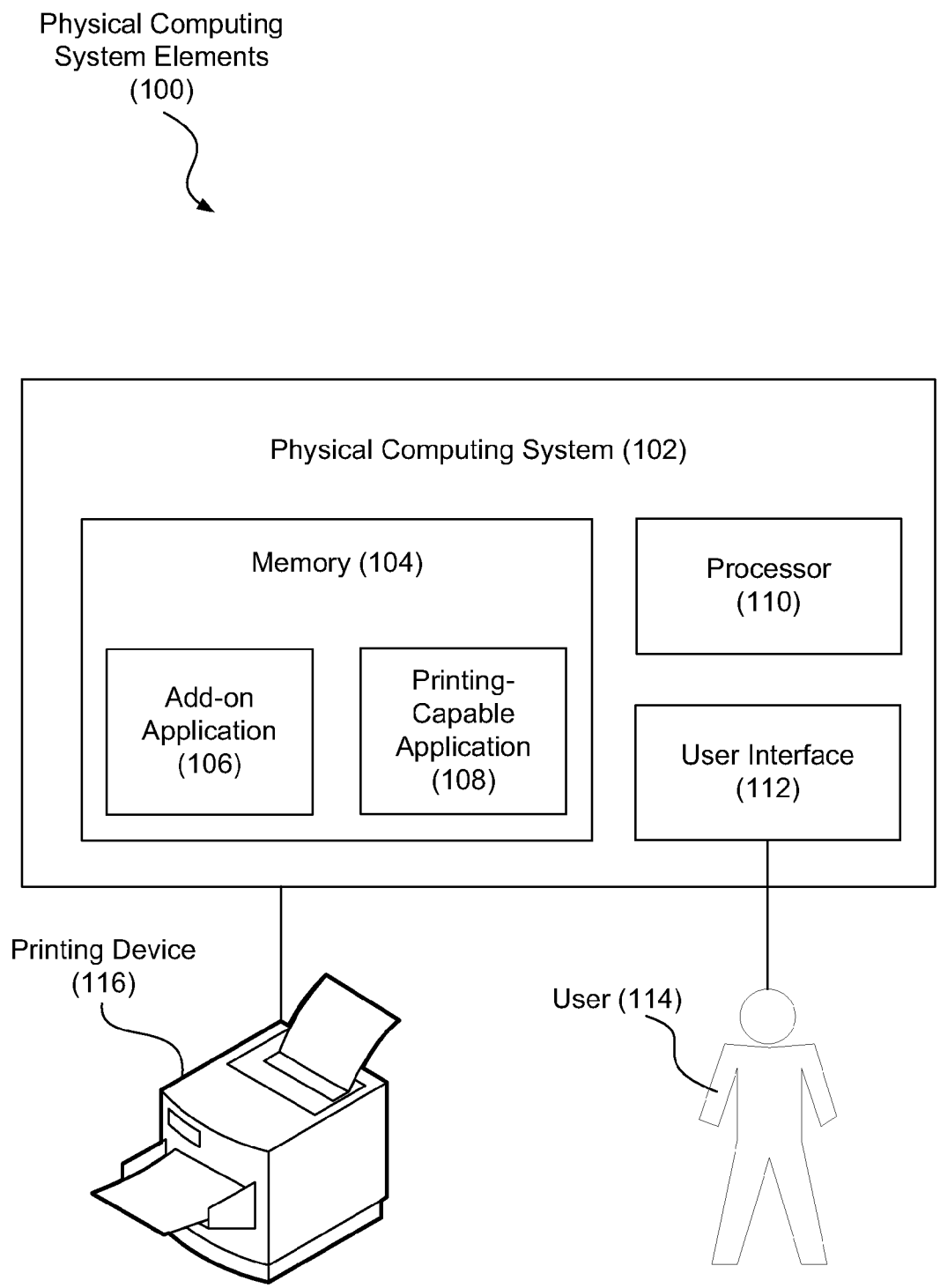
FIG. 1 is a diagram showing illustrative physical computing system components, according to one example of principles described herein.

As mentioned above, using current printing processes, a user will first print an electronic document and then view the printout. If the coloring or placement of elements of the print job is not satisfactory, then the user will make changes to the electronic document using the electronic document's associated computer application. The user will then reprint the electronic document and again view the printout. This process may often need to be repeated several times for each different electronic document that the user desires to print. Furthermore, the user may need to use a separate printer utility application, if available, to utilize the full features of the printing device performing the desired print job.

In light of this and other issues, the present specification relates to a system and method for providing a user with more interaction with a printing device from within a computer application used to manage electronic documents. According to certain illustrative examples, add-on application interfaces are provided with a computer application designed to create, edit, manage and print various types of electronic documents. Such a computer application will be referred to throughout this specification as a "printing-capable application." The add-on application is designed to interface with a printing-capable application and directly with the hardware of a printing device. The add-on application will allow full interaction with all of the available features of the printing device through the printing-capable application itself. Such an add-on application may have no need to use a printer driver. However, in some examples, a printer driver may still be used.

A method or system embodying principles described herein will provide an improved user experience with the printing workflow process. For example, the user may be able to see exactly what the printed image will look like before it is printed, both in terms of color and in terms of placement of the image elements on the paper or other print medium onto which it will be printed. This may avoid the scenarios in which a user needs to print one or more test prints and then adjust the coloring of the image until the printed image appears as desired. If a number of test prints are nevertheless printed to assure the desired coloring, the user may then save the resulting color profile for use with subsequent print jobs. Thus, the user does not need to once again generate any test prints when printing subsequent images.

Additionally, the user may be kept apprised of the status of the printing device through the add-on application. For example, the user may be alerted through the add-on application if an ink cartridge is out of ink or if the printing device has a number of documents in queue. This information may be provided without the use of a separate printer utility application.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

Throughout the present specification and in the appended claims, the term "printing-capable application" is to be broadly interpreted as any application which generates, opens, operates, displays, edits or manages any type of electronic document which may be printed.

Throughout this specification and in the appended claims, the term "add-on application" is to be broadly interpreted as an application that interfaces with and provides additional functionality to another application. For example, an add-on application may provide additional functionality to a printing-capable application.

Referring now to the figures, FIG. 1 is a diagram showing the elements of an illustrative physical computing system (100). According to certain illustrative examples, a physical computing system (102) may include a memory (104) having at least an add-on application (106) and a printing-capable application (108) stored thereon. The physical computing system (102) may also include a processor (110) and a user interface (112). Additionally, the physical computing system (102) may be configured to be communicatively coupled to a printing device (116).

A physical computing system (102) may be embodied as a variety of physical computing devices including, but not limited to, a laptop computer, a desktop computer, and a Personal Digital Assistant (PDA). A physical computing system may include standard components such as a processor (110) to execute instructions and memory (104) for storing applications (106, 108) and data.

A typical physical computing system (102) generally includes a form of memory (104). There are many types of memory available. Some types of memory, such as hard disk drives, optical disc drives, and solid state drives, are designed for storage. These types of memory typically have large storage volume but relatively slow performance. Other types of memory, such as those used for Random Access Memory (RAM), are optimized for speed and are often referred to as "working memory." The various forms of memory may store information in the form of software.

Various types of software may be utilized by a physical computing system (102). For example, one type of software which may be stored in memory is a printing-capable application. A printing-capable application may include any application that opens, operates, displays, or manages an electronic document which may be printed by a printing device. Some printing-capable applications are image related. For example, some types of applications allow a user to edit and print photographs, graphic designs and other images. These applications typically print their associated image documents by sending the required data to a printing device. A printer driver is used to communicate with the hardware of the printing device and print the appropriate image.

An add-on application (106) is an application that interfaces with, and provides additional functionality to, another application. For example, an add-on application (106) to a photo-editing application may provide additional photo-editing tools. Add-on applications (106) are generally developed by those who are familiar with the Application Programming Interface (API) of the application with which the add-on application interfaces.

The user interface (112) may enable interaction between the physical computing system (102) and a user (114). The user interface (112) may include a display device as well as an input receiving device such as a keyboard or a mouse. Through the user interface (112), the user (114) is able to send commands to the physical computing system (102). These commands may involve interaction with the add-on application (106) and/or the printing-capable application. Information related to these applications may be presented to the user (112) through the display device.

A printing device (116) is typically designed to receive data from a physical computing system (102). The physical computing system (102) interacts with the printing device (116) through use of a printer driver. A driver is a piece of software which is configured to run a specific set of hardware. Thus, through the printer driver, the physical computing system (102) is able to translate data into a form that is able to be used by the printing device (116).

Figure 2:
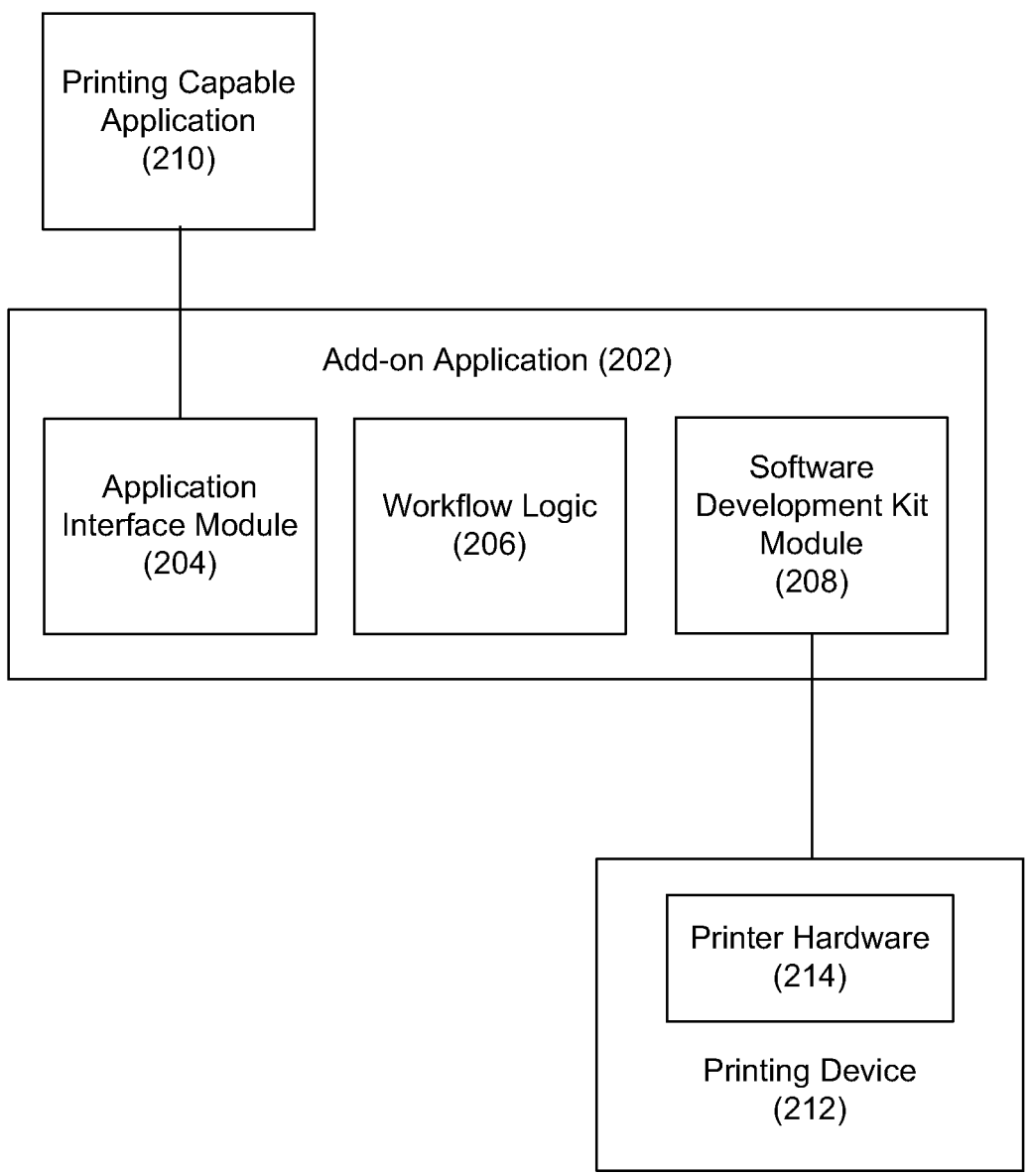
FIG. 2 is a diagram showing illustrative add-on application components, according to one example of principles described herein.

FIG. 2 is a diagram showing the components of an illustrative add-on application (202) configured to interface with a printing-capable application (210) and printer hardware (214). According to certain illustrative examples, the add-on application (202) may include an application interface module (204), workflow logic (206), and a software development kit module (208).

The application interface module (204) allows the add-on application to interface with the printing-capable application (210). The application interface module (204) is designed to interface with a specific application or type of application. For example, an add-on application may be configured to interface with Adobe Photoshop®, developed and published by Adobe Systems Inc. located in Mountain View Calif. Many applications such as web browsers, text editors, and photo-editing applications include an add-on manager. The add-on manager allows an add-on to register with the main application and provides a protocol for the exchange of data between the add-on application and the main application. One common method of providing such functionality is through use of an API. The API allows a developer of an add-on to write the code that will properly function with the main application.

The workflow logic (206) includes all of the logic and programming which provides the main functions of the add-on application. For example, the workflow logic (206) may include the data and programming to walk a user through the printing process. The data and programming is designed specifically for the application with which the add-on application interfaces. An example of a printing workflow will be discussed in the text below corresponding to FIG. 4.

The software development kit module (208) is a component of the add-on application (202) that is created by a Software Development Kit (SDK). An SDK is typically a set of development tools which allow the creation of applications for a specific hardware platform. Specifically, an SDK may be used to develop application components for interaction with the printer hardware (214) of a printing device (212). According to certain illustrative examples, the SDK module (208) is configured to send and receive information from the printing device (212). For example, the SDK module (208) may convert data into a specific format required for printing and send that formatted data to the printing device (212). The SDK module (208) also receives information from the printing device (212) including, but not limited to, ink cartridge levels, printing device status, ink characteristics, and print medium characteristics.

Receiving information from the printing device (212) directly into a printing-capable application (210) through the add-on application (202) provides several benefits. For example, the characteristics of the ink used by the printing device (212) may affect the coloring of a printed image. With that information, the add-on application (202) may display to a user more precisely what an image may look like when it is printed without having to open a separate printer utility application. The user may then have the option of making adjustments with the printing-capable application (210) itself instead of with a separate printer utility application. Thus, the use of an add-on application (202) which interfaces both with the main printing-capable application (210) and the printer hardware (214) provides additional convenience for the user. Indeed, the complete functionality of the printing device may be accessed from within the printing-capable application (210).

Figure 3:
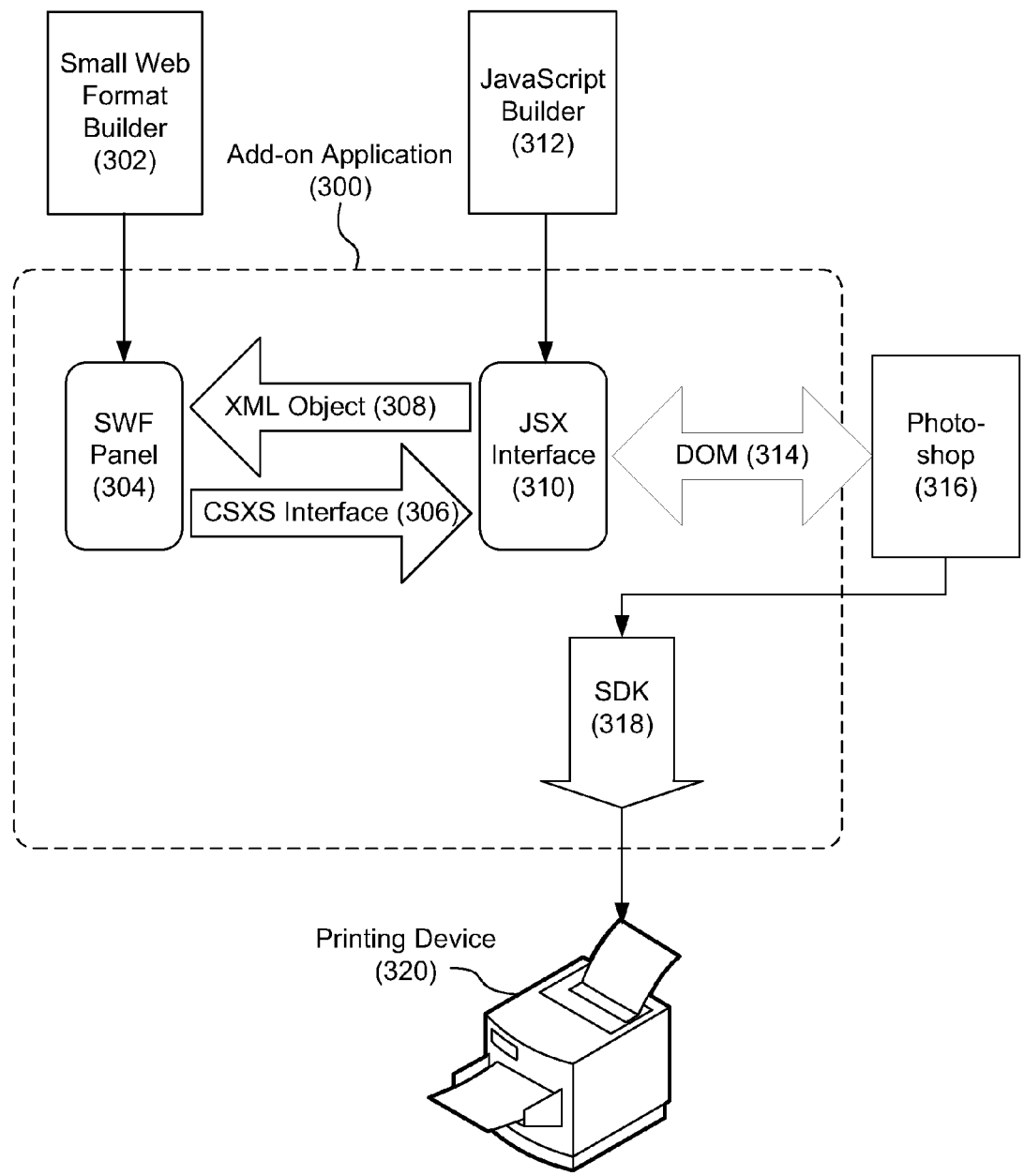
FIG. 3 is a diagram showing an illustrative relation of add-on application components, according to one example of principles described herein.

FIG. 3 is a diagram showing an illustrative relationship among components of an add-on application (300). According to certain illustrative examples, an add-on application (300) may be a Small Web Format (SWF) panel (304). The SWF panel (304) may be created by an SWF builder (302). The SWF panel (304) may utilize JavaScript libraries from a JavaScript file (310) created by a JavaScript Builder (312). Through use of a Document Object Model (DOM) (304), the SWF panel (304) may interact with a printing-capable application such as Adobe® Photoshop® (316). Through the add-on, Adobe® Photoshop® may be able to utilize the SDK components (318) to interact with a printing device (320).

Small Web Format (SWF) is a file format which is a partially open repository for multimedia and vector graphics. The SWF format is configured to be small enough for publication on the internet. SWF files typically include animations and/or applets offering various degrees of functionality. An SWF builder (302) may be used to construct an SWF panel (304). An example of an SWF builder (302) is a combination of Adobe® Flash® Builder™ and Adobe® Flash®, both published by Adobe Systems Incorporated.

The SWF panel (304) may utilize JavaScript (JSX). A JSX file (310) created by a JavaScript Builder (312) may include a number of JavaScript libraries which may be used by the SWF panel (304). The SWF panel (304) may interact with the JSX interface (310), for example, via an eXtensible Markup Language (XML) object (308) and a Creative Suite eXtensible Services (CSXS) Interface. In the example that the printing-capable application is Adobe® Photoshop®, the JSX interface (310) may interact with the Adobe® Photoshop® (316) software via a Document Object Model (DOM). A DOM is a cross-platform and language-independent convention for representing and interacting with objects in HTML, XHTML and XML documents.

As mentioned above, the add-on application (300) includes a component created by a software development kit, allowing the add-on application (300) to interact directly with the printer hardware in the printing device (320). This bypasses the need for a standard printer driver and allows the main application to more effectively work with the printing device (320). In the current example, the SWF panel (304) includes the SDK (318) components which allows Adobe® Photoshop® (316) to interface directly with a printing device (320). The printing device (320) may be connected locally to the computing system which is processing Photoshop (316) and the SWF panel (304). Alternatively, the printing device (320) may be remotely connected to the computing system processing Adobe® Photoshop® (316) and the SWF panel (304) over a computer network such as the Internet or a Local Area Network (LAN).

Figure 4:
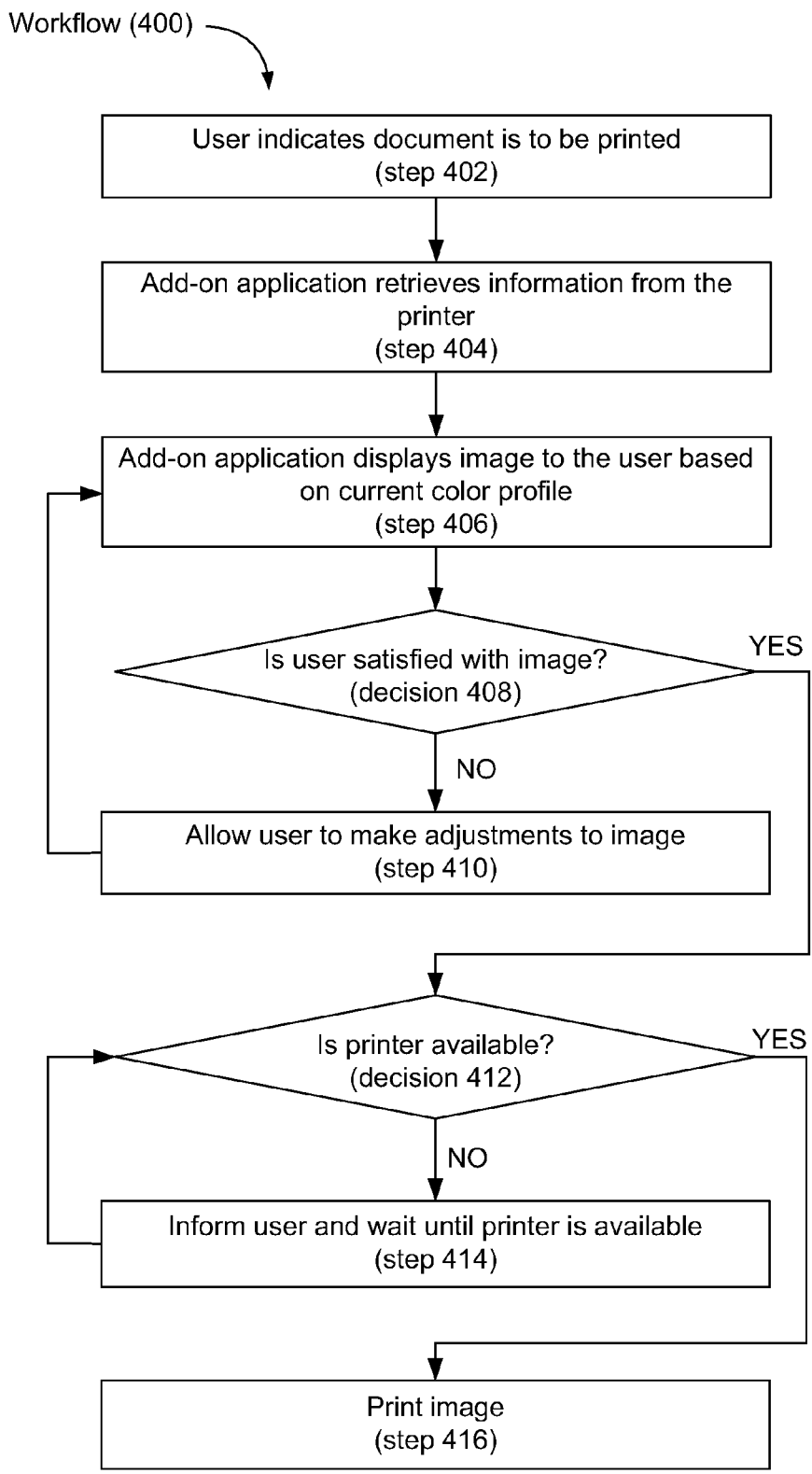
FIG. 4 is a flowchart showing an illustrative workflow to be managed by an add-on application, according to one example of principles described herein.

FIG. 4 is a flowchart showing an illustrative workflow (400) to be managed by an add-on application. The workflow starts when a user indicates (step 402) that a document is to be printed. The add-on application then retrieves (step 404) information regarding the status of the printing device. This information may include the ink levels in the ink cartridges, the type of ink in the ink cartridges, the type of print medium currently placed in the printing device, and whether or not the printing device is currently processing other requests.

The add-on application may use the information received from the printing device to display (step 406) to the user an image based on the current color profile to which the add-on application is set. The add-on application may also use information received from the printing device such as the type of inks currently in the ink cartridges, the size and type of the print medium placed into the printing device to appropriately render the image to the user. This information may affect the appearance of an image printed by the printing device. For example, different types of inks may produce a slightly different color gamut. Additionally, the type of print medium may also affect the appearance of a printed image. For example, slight differences in the whiteness of a print medium will affect the coloring of a printed image. Furthermore, the print medium may be paper based or vinyl based which will also affect the coloring of the printed image.

Depending on the monitor used to display the image to be printed to the user, there may be slight variations between the way the colors are rendered on the monitor and printed on the image. After a user prints an image, he or she may still decide that the coloring is not quite right on the printed image. The user may then make adjustments to the coloring shown on the monitor and then reprint the image. This process may be repeated until the user is satisfied with the coloring of the printed image. The user may then save the color profile for future use. The saved color profile allows the user to print subsequent electronic documents without having to go through the process of repeatedly running test prints. In some cases, the user may save different color profiles for different types of electronic documents, different categories of a type of electronic document, different printing devices, different types of print media, and different ink cartridge types.

The add-on application may then determine (decision 408) whether or not the user is satisfied with the image as displayed with the current color profile. Even if the current color profile was created and saved by the user based on a previously printed image, the user may wish to make additional adjustments to the color profile for the new image being printed. The user may then again run test prints until he or she is satisfied with the final output. Thus, if the user is not satisfied (decision 408, NO) with the image, then the add-on application may allow (step 410) the user to make adjustments to the image. The add-on application may then again display (step 406) the image to the user as it will be printed. When the user is indeed (decision 408, YES) satisfied with the displayed image, the workflow (400) may then proceed to the next step.

The add-on application may then determine (decision 412) whether or not the printing device is available. If the printing device is not (decision 412, NO) available, then the user may be informed (step 414) that the printing device is not available. The user may then have to wait until the printing device is available for the workflow to proceed. When the printing device is indeed (decision 412, YES) available, then the image may be printed (step 416) by the printing device.

Figure 5:
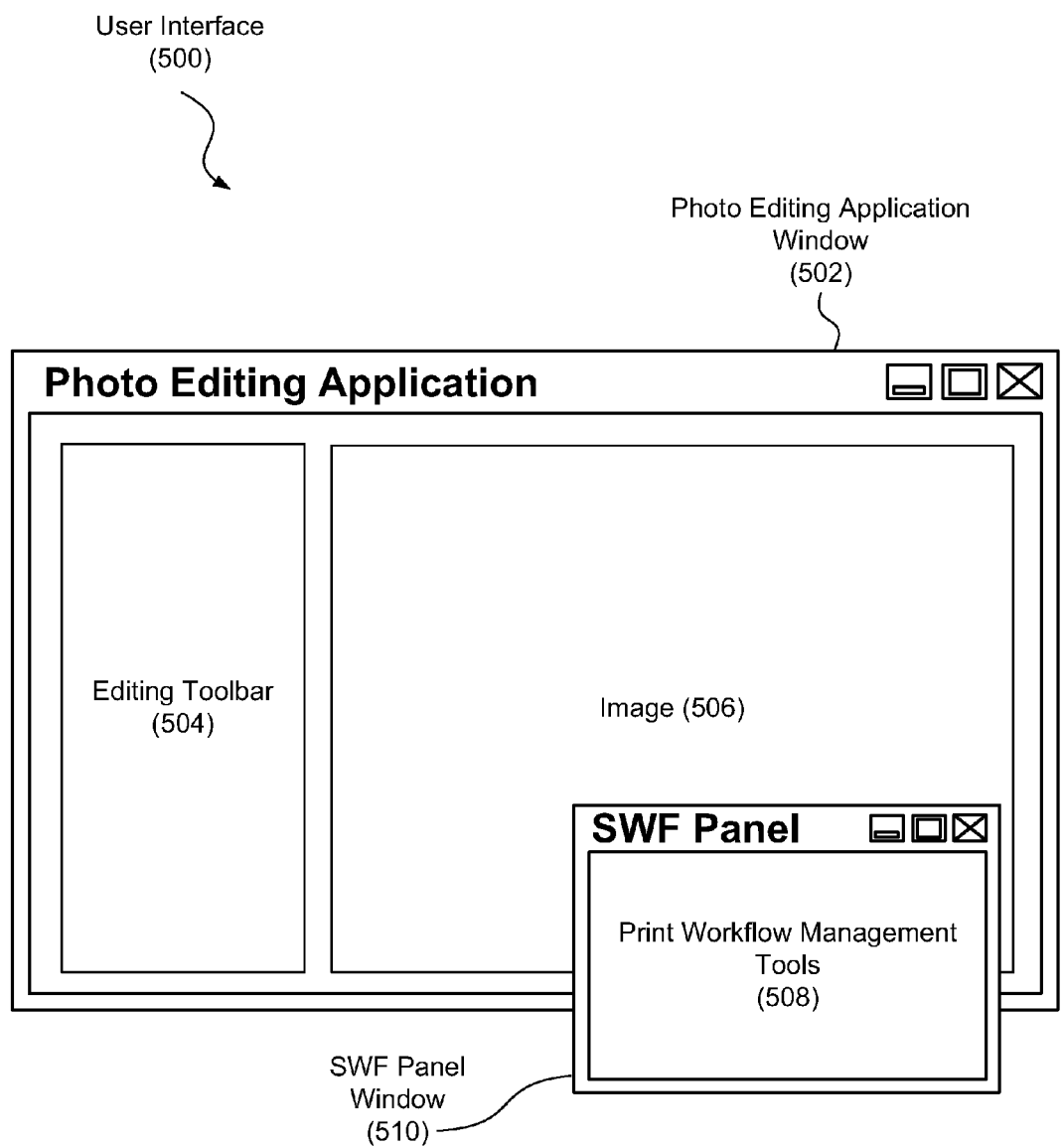
FIG. 5 is a diagram showing an illustrative add-on application with a printing-capable application, according to one example of principles described herein.

FIG. 5 is a diagram showing an illustrative user interface (500) of add-on application with a printing-capable application. According to certain illustrative examples, the printing-capable application may be a photo-editing application. Additionally, the add-on application may be an SWF panel. The user interface (500) may include a photo editing application window (502) and an SWF panel window (510).

The photo-editing application window may display an image (506) which is currently being edited and a set of editing tools within an editing toolbar (504). In some examples, the add-on application may provide additional tools within the editing toolbar (504) and/or additional menu items in the main window menu bar.

Additionally or alternatively, the add-on application may provide a window such as an SWF panel window (510). Some or all of the added functionality of the add-on application may be provided within the SWF panel window. For example, a number of print workflow management tools (508) may be displayed and interacted with through the SWF panel window (510).

In some examples, the SWF panel window (510) may be non-modal. A modal window is one which appears and requests information from a user. The user is then unable to interact with the main application until the modal window receives a response from the user. A non-modal window is thus one in which the main application may still be interacted with even when the non-modal window is being displayed. A user may move the non-modal window around the screen and out of the way of whatever features of the main application with which the user desires to interact.

The features and functionality of an add-on application may trigger events within the main application. For example, if the user indicates through the SWF panel window (510) that he or she wishes to print the image (506); the add-on application may trigger whatever functionality of the main application is used to prepare a document for printing. Additionally, the add-on application may trigger additional add-on applications which may include printing functionality. For example, the add-on application may trigger a third party printing interface.

FIG. 6 is a flowchart showing an illustrative method for managing a print workflow. According to certain illustrative examples, the method may include, with an add-on application executed by a physical computing system, interfacing (step 602) with a printing-capable application executed by the physical computing system; with the add-on application, interfacing (step 604) with hardware components of a printing device; with the add-on application, provide (step 606) additional printing related functionality to the printing-capable application. The method (600) may further include, with the add-on application, receiving (step 608) data from the printing device.

In sum, a method or system embodying principles described herein will provide an improved user experience with the printing workflow process. For example, the user may be able to see exactly what the printed image will look like before it is printed out both in terms of color and in terms of placement of the image on the paper or other print medium onto which it will be printed. This may be done by a user printing test prints and adjusting the coloring of the image until the printed image appears as desired. The user may then save the color profile for use with subsequent print jobs. Thus, the user does not need to once again run repeated test prints when printing subsequent images. Additionally, the user may be kept apprised of the status of the printing device through the add-on application. For example, the user may be alerted through the add-on application if an ink cartridge is out of ink or if the printing device has a number of documents in queue. This information may be provided without the use of a separate printer utility application.

The preceding description has been presented only to illustrate and describe examples and examples of the principles described. This description is not intended to be exhaustive or to limit these principles to any precise form disclosed. Many modifications and variations are possible in light of the above teaching.

What is claimed is:

1. A computing system comprising:
a processor; and
a memory communicatively coupled to said processor;
in which said processor:
   causes an add-on application to interface with a printing-capable application configured to be executed by said processor;
   causes said add-on application to interface with hardware components of a printing device; and
   causes said add-on application to provide additional printing related functionality to said printing-capable application;
in which said processor further saves a color profile created by a user, said color profile comprising adjustments made by the user to colors of a first document to be printed and being available for use on subsequent print jobs such that said same adjustments are applied from the color profile to a second subsequent document to be printed.

2. A computing system comprising:
a processor; and
a memory communicatively coupled to said processor;
in which said processor:
   causes an add-on application to interface with a printing-capable application configured to be executed by said processor;
   causes said add-on application to interface with hardware components of a printing device; and
   causes said add-on application to provide additional printing related functionality to said printing-capable application;
in which said processor further causes said add-on application to receive data from said printing device, wherein said add-on application changes an image of a document to be printed that is displayed electronically to a user, said changes to said image being based on said data received from said printing device; and
in which said data received from said printing device comprises any of information about inks currently being used by the printing device and information about a print medium currently being used by the printing device.

* * * * *